(12) United States Patent
Seamons et al.

(10) Patent No.: US 6,349,338 B1
(45) Date of Patent: Feb. 19, 2002

(54) TRUST NEGOTIATION IN A CLIENT/SERVER DATA PROCESSING NETWORK USING AUTOMATIC INCREMENTAL CREDENTIAL DISCLOSURE

(75) Inventors: Kent Eldon Seamons, Wexford; William Hale Winsborough, Pittsburgh, both of PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/260,249

(22) Filed: Mar. 2, 1999

(51) Int. Cl.[7] .............................................. G06F 15/16
(52) U.S. Cl. ....................... 709/229; 713/169; 713/200; 713/201
(58) Field of Search ................................. 713/201, 203, 713/200, 156, 153, 169, 155; 703/156; 709/203, 228–229; 705/76

(56) References Cited

U.S. PATENT DOCUMENTS

| | | | | |
|---|---|---|---|---|
| 5,225,664 A | * | 7/1993 | Iijima .......................... | 235/380 |
| 5,235,642 A | * | 8/1993 | Wobber et al. .............. | 713/156 |
| 5,299,263 A | * | 3/1994 | Beller et al. ................. | 430/600 |
| 5,434,918 A | * | 7/1995 | Kung et al. .................. | 713/169 |
| 5,473,689 A | | 12/1995 | Eberhard ..................... | 380/23 |
| 5,481,720 A | * | 1/1996 | Loucks et al. ............... | 713/201 |
| 5,560,008 A | * | 9/1996 | Johnson et al. .............. | 713/20 |
| 5,586,260 A | * | 12/1996 | Hu .............................. | 713/201 |
| 5,826,021 A | * | 10/1998 | Mastors et al. .............. | 709/203 |
| 5,995,624 A | * | 11/1999 | Fielder ........................ | 713/169 |
| 6,058,477 A | * | 5/2000 | Kusakabe et al. ........... | 713/169 |
| 6,195,682 B1 | * | 2/2001 | Ho et al. ..................... | 709/203 |
| 6,199,113 B1 | * | 5/2001 | Alegre et al. ................ | 709/229 |

FOREIGN PATENT DOCUMENTS

| | | | |
|---|---|---|---|
| EP | 505 302 A1 | 9/1992 | ............. H04L/9/00 |
| EP | 580 350 A1 | 1/1994 | ............. G06F/1/00 |
| WO | WO 98/07085 | 2/1998 | ............. G06F/1/00 |

OTHER PUBLICATIONS

Journal of Computer Security, vol. 5, No. 3, 1997, pp. 255–267 "Using Digital Credentials on the World Wide Web", M. Winslett, N. Ching, V. Jones, I. Slepchin.

* cited by examiner

*Primary Examiner*—Glenton B. Burgess
*Assistant Examiner*—Kimberly Flynn
(74) *Attorney, Agent, or Firm*—Jeanine S. Ray-Yarletts

(57) ABSTRACT

In client/server computing, especially in the field of e-commerce, digitally signed credentials are passed between client and server to develop trust between the parties. However, this requires that one party disclose its credentials (which could be considered sensitive) to the other party before the disclosing party knows anything about the receiving party (someone has to go first). To solve this problem, the invention implements a negotiation of credential disclosure called automatic incremental credential disclosure. Each credential held at a local site is associated with an access policy which is based on opposing site credentials. Incoming requests for credentials are logically combined with the access policies to derive further negotiation responses.

17 Claims, 3 Drawing Sheets

TRUST NEGOTIATION IN A CLIENT/ SERVER DATA PROCESSING NETWORK USING AUTOMATIC INCREMENTAL CREDENTIAL DISCLOSURE

FIELD OF THE INVENTION

The invention relates to the field of client/server (also known as "distributed") computing, where one computing device ("the client") requests another computing device ("the server") to perform part of the client's work.

BACKGROUND OF THE INVENTION

Client/server computing has become more and more important over the past few years in the information technology world. This type of distributed computing allows a software process (e.g., the client) running on one machine to delegate some of its work to a software process (e.g., the server) running on another machine that might be, for example, better suited to perform that work. The client and server could also be separate software processes running on the same machine.

In such client/server systems, it is very important that the client and the server develop a sufficient level of trust in each other before they engage in a meaningful interaction, because the information that may be exchanged during the client's request for server processing and/or the server's processing result which is returned to the client may be highly sensitive information. Oftentimes, the client and the server have no prior relationship with each other and thus they must enter into some type of an initial conversation in order to determine whether they can trust each other before they disclose any potentially sensitive information. A good example of where this is particularly useful is when the client is a World Wide Web browser application sending electronic commerce requests over the Internet to a World Wide Web server application. On the initial interaction between these parties, the Web client and the Web server do not have any prior relationship and the Web client, for example, may be very reluctant to provide a credit card number to the Web server over the Internet.

It is known in the prior art to exchange credentials (i.e., digitally signed assertions by the credential issuer about the credential owner) between a client and a server in order to develop trust between them. A credential is signed by using the issuer's private key and can be verified by using the issuer's public key. The credential aggregates one or more attributes of the owner, each attribute consisting of a name/ value pair and describing some property of the owner asserted by the issuer. Each credential also contains the public key of the credential owner. The owner can use the corresponding private key to answer challenges or otherwise demonstrate ownership of the credential. The owner can also use the private key to sign another credential owned by a third entity.

Thus, as is well known in the prior art, credentials may be combined into chains, where the owner of one credential is the issuer of the next credential in the chain. These chains can be submitted to trace a web of trust from a known entity (the issuer of the first credential in the chain) to the submitting entity, in whom trust needs to be established. The submitting entity is the owner of the last credential in the chain. The submitting entity can demonstrate ownership of that credential by demonstrating possession of the private key mate of the public key contained therein. The other supporting credentials are owned by entities with whom the submitting entity has direct or indirect relationships, and although they are not owned by the submitting entity, the submitting entity does keep and submit copies of them. Each supporting credential contains the public key whose private key mate was used to sign the next credential in the chain.

All the submitted credentials are relevant to demonstrating a (possible indirect) relationship between the submitting entity and the known entity that issued the first credential in the chain. The nature of that relationship can be inferred by inspecting the attributes of the credentials in the chain. Multiple chains can be submitted to establish a higher degree of trust or to demonstrate additional properties of the submitting entity and its relationships with known entities.

Prior art techniques for using credentials to establish mutual trust can be divided into two basic approaches. The first approach is described by A. Frier, P. Karlton, and P. Kocher, "The SSL 3.0 Protocol", Netscape Communications Corporation, Nov. 18, 1996; T. Dierks, C. Allen, "The TLS Protocol Version 1.0", draft-ietf-tls-protocol-06.txt, Nov. 12, 1998; S. Farrell, "TLS Extensions for Attribute Certificate Based Authorization", draft-ietf-tls-attr-cert-01.txt, Aug. 20, 1998. This approach will be referred to as the SSL approach, as it is used by SSL, TLS, and TLS with extensions for attribute-certificate-based authorization. In the SSL approach, the client and the server can exchange credentials as follows. The server initiates the negotiation by unilaterally disclosing a pre-selected credential. It can include a request for client credentials, including the type of credential the server can accept and, in the attribute-certificate case, a template indicating the required attributes.

The second approach is described by N. Ching, V. Jones, and M. Winslett, "Authorization in the Digital Library: Secure Access to Services across Enterprise Boundaries", Proceedings of ADL '96 - - - Forum on Research and Technology Advances in Digital Libraries, Washington, D.C., May 1996, available at http://drl.cs.uiuc.edu/security/ pubs.html; and also by M. Winslett, N. Ching, V. Jones, and I. Slepchin, "Using Digital Credentials on the World-Wide Web", Journal of Computer Security, 5, 1997, 255–267, available at http://drl.cs.uiuc.edu/security/pubs.html. We will call this second approach the digital credentials approach. In this approach, when a request for service is made by a client to a server without adequate credentials attached, the server sends to the client a policy governing that service. A policy is a credential formula, that is, a logical combination of required credentials and expressed constraints on the attributes that they contain. Policies can be used to characterize required properties of the submitting entity and its relationships with known entities. By receiving this policy as a request for credentials, the client has the opportunity to select in private credentials to submit to authorize service. By sending policies to clients, servers off-load credential selection. The practice also enables different servers to have very different policies, requiring different client attributes and accepting credentials issued by different authorities.

Both of these two prior art approaches support the server sending a request for credentials to the client, including a characterization of credentials that would be acceptable to the server. However, the present inventors have noted deficiencies in this present state of the art as follows.

In the SSL approach, there is no opportunity for the server to authenticate any information about the client before disclosing the server's credential. The server may regard its credential as highly confidential, and thus, if the client and server fail to establish mutual trust, then the server has turned over to the client a highly sensitive (confidential)

piece of information. Furthermore, if the credential disclosed by the server does not satisfy the client, the client has no opportunity to request additional credentials from the server. This can be a serious problem when the client and server have no prior relationship. In that case it is unlikely that any single credential issuer would be an acceptable authority on all server attributes of interest to all clients.

The shortcoming of prior systems based on the digital credentials approach arises with credentials that the client wishes to disclose only to servers in whom some degree of trust has already been established. Prior systems developed using the digital credentials approach have supported client-credential submission policies that partitioned services into equivalence classes and then, for each equivalence class, assigned each client credential to one of two categories. Credentials in the first category could be submitted with any service request in the equivalence class. Those in the second category could be submitted only after interactively consulting the user for authorization. These consultations permitted the user to move credentials from the second category to the first, enabling subsequent automatic submission. However, the mechanism is not fully automated in that it requires a user be available to make trust decisions when new service classes are contacted.

Within the context of the digital credentials approach, an alternative technique is briefly described by Winslett, et al. (cited above) whereby the client can require server credentials to unlock disclosure of its own credentials. That technique can be used to implement a negotiation in which there is a single request for credentials by each participant. Each service is associated with a policy that is sent to the client by the server when the client requests that service. When the scenario is reversed, it is unclear what purpose is intended by having servers present credentials to clients. One possibility is to establish client trust for the general purpose of interacting with the server. Another is to establish trust specifically to encourage clients to disclose their credentials. In the latter case, the approach could be used to enable a client to require credentials from the server prior to disclosing any of its own credentials to that server. However, it would be impossible for the server then to request client credentials before disclosing its own credentials. Doing so would introduce a cyclic dependence, bringing the negotiation to deadlock, because in this model all client credentials are governed by the same policy and, hence, any subsequent server request would lead to an identical request from the client.

SUMMARY OF THE INVENTION

According to a first aspect the present invention provides a data processing apparatus for use in a client/server network where a client data processing apparatus sends a data processing request to the server data processing apparatus and the server data processing apparatus performs data processing based on the request and returns a reply to the client data processing apparatus, the data processing apparatus comprising: storage means for storing a plurality of local site credentials; means for receiving a first credentials request from an opposing site data processing apparatus, the credentials requested by the first credentials request being local site credentials stored in the storage means that satisfy a first logical expression provided with the first credentials request; and means for sending to the opposing site data processing apparatus a second credentials request which is dependent upon the contents of the first credentials request, the credentials requested by the second credentials request being opposing site credentials that satisfy a second logical expression provided with the second credentials request.

According to a second aspect, the invention provides a method of operating the data processing apparatus of the first aspect.

According to a third aspect, the invention provides a computer program product stored on a computer readable storage medium for, when run on a computer, carrying out the method steps of the second aspect.

According to a fourth aspect, the invention provides a computer data signal embodied in a carrier wave, the signal having program elements for instructing a computer to carry out the method steps of the second aspect.

Thus, the present invention extends the prior art digital credentials approach to support a sequence of interdependent requests for credential disclosures. In order to allow for a sequence of interdependent requests for credential disclosures, different credentials must be governed.by different policies. The request for credentials that the client receives from the server is not for individual credentials, or even for a specific combination of credentials. Instead, it is for arbitrary credentials that satisfy a logical expression. In the present invention the incoming request for credentials is logically combined with the credentials actually possessed by the client, together with the access-control policy associated with each of those credentials, to derive a new request for opposing-site credentials. Thus, the present invention comprises any derivation of a respondent request for credentials from a local credential-access policy and an incoming request for credentials, except in the case where the respondent request is independent of the incoming request. And in the latter, excepted case, a sequence of incremental credential disclosures is impossible because of cyclic dependencies, as discussed above.

No prior solution explicitly recommends using credentials as a basis for governing credential disclosure. There is no mention of the problem of interdependencies between credentials and the need to require different credential-access policies for different policies to avoid certain deadlock. These are aspects of automating trust establishment between strangers who keep their credentials private that have been overlooked in the past.

There has also been no prior mention of dynamically synthesizing credential requests during trust establishment. Prior solutions have selected credential-request content from pre-existing policies.

The invention thus provides for fully automating trust negotiation between stranger data processing apparatuses who protect their credentials. Simple negotiation strategies can be applied immediately. More sophisticated techniques, which balance the concerns of successful negotiation and avoiding inadvertent disclosure of information about credentials held, can also be considered.

An important advantage provided by the present invention is that it enables trust to be established automatically, even when the parties involved require some knowledge of their counterparts before disclosing some of their credentials to them. In prior solutions, each participant had only one opportunity to present credentials within each negotiation, and one of the participants had to go first. Unlike prior solutions, the present invention does not require either negotiation participant to disclose its credentials all at once, without any knowledge of the other participant. To obtain a highly sensitive service, a client may have to submit a highly sensitive credential that it discloses only after first obtaining a moderately sensitive server credential. For this, the server may in turn require some less sensitive credential.

The present invention makes it possible to negotiate an arbitrary-length sequence of dependent credential exchanges.

In some cases, such a sequence can enable a higher degree of trust to be negotiated than can a single exchange. This makes the new solution potentially very important in the context of e-business (i.e., electronic business) among strangers, where automated business negotiations will require a high degree of trust that the participants will bargain in good faith and handle disclosed information appropriately.

The present invention provides a basis for automatic negotiation of incremental credential disclosure. It does this by associating with each credential held at a local site an access policy based on opposing-site credentials and by providing for the logical combination of that policy with incoming. requests for credentials to derive negotiation responses.

BRIEF DESCRIPTION OF THE DRAWINGS

The present invention will be better understood by the detailed description of the preferred embodiments thereof, provided below in conjunction with the following drawing figures.

DETAILED DESCRIPTION OF THE PREFERRED EMBODIMENTS

Figure 1:
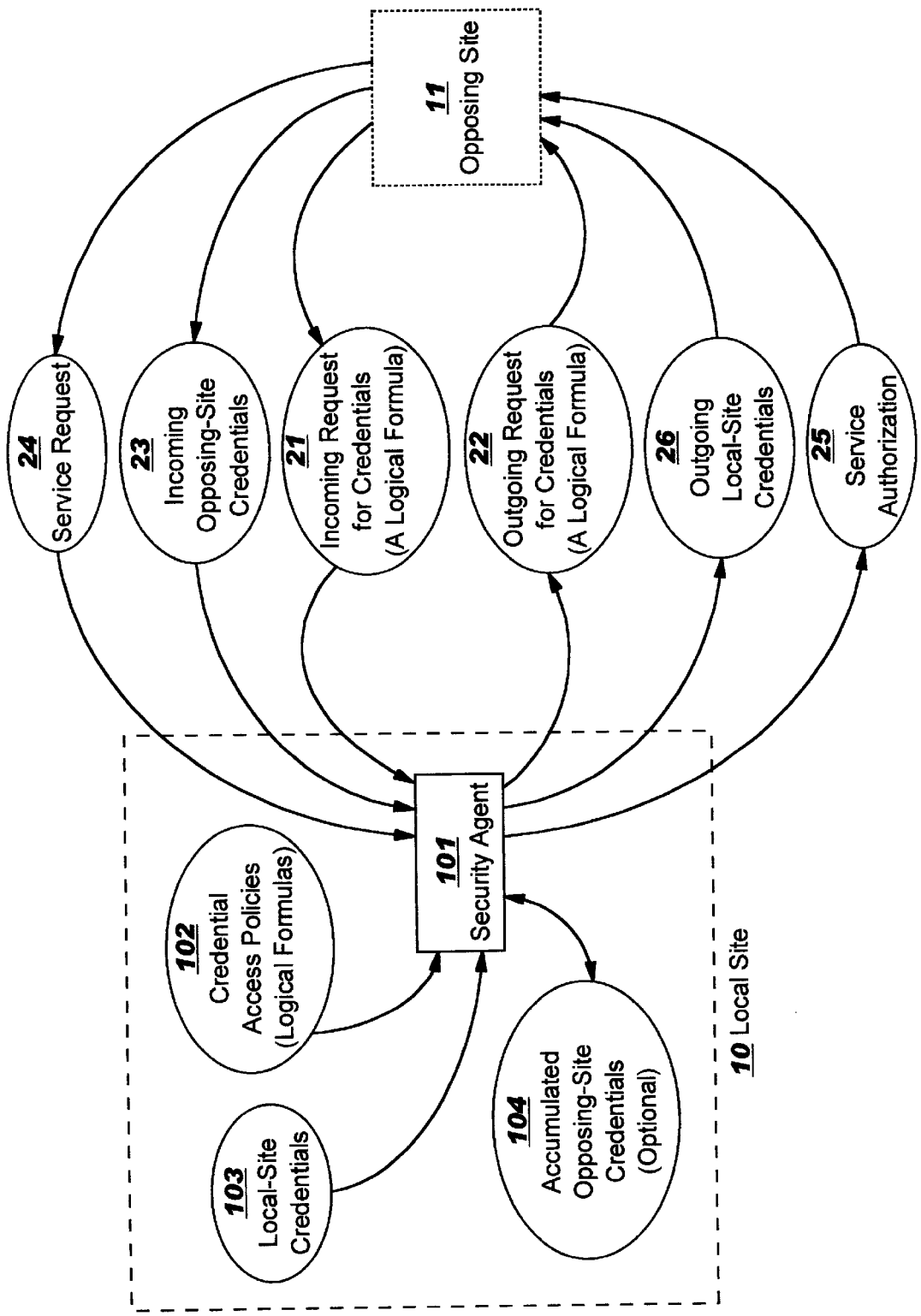
FIG. 1 is a block diagram showing the software components according to a preferred embodiment of the present invention.

In the preferred embodiment of the present invention, a plurality of data processing units are in communication with each other via a data communications network. In FIG. 1 a local site 10 is shown in communication over the network (not shown) with an opposing site 11, both of these sites are data processing units in the preferred embodiment (in another embodiment they may be separate processes running on the same data processing unit). Following the second prior art approach [Ching, et al., Winslett, et al.] discussed above, a data processing unit (i.e., negotiation participant) is represented in trust negotiations by a security Agent 101, as pictured in FIG. 1. Each negotiation participant can receive a request for credentials (Incoming Request for Credentials 21, FIG. 1). (Each request for credentials takes the form of a credential formula,. as in the second prior art approach discussed above.) This request is for the disclosure of local-site credentials to the opposing site. The purpose of this disclosure can be either to unlock service, or to unlock disclosure of opposing-site credentials needed to further the trust negotiation. The immediate problem in furthering the negotiation is to determine whether the local site 10 has sufficient trust in the opposing site 11 to disclose the requested credentials and, if not, to construct a request for opposing-site credentials (Outgoing Request for Credentials 22) that could establish that trust.

As pictured in FIG. 1, each site associates a credential access policy 102 with each of its own credentials 103. That access policy identifies opposing-site credentials that would unlock disclosure of the local-site credential. When a request for credentials 21 is received, the Security Agent 101 determines what action is appropriate. That determination is described in the following paragraphs in conjunction with the architectural diagram in FIG. 1 and with the steps (31–37) of the flowchart pictured in FIG. 2.

The actions of the Security Agent begin in step 31 when it receives from the opposing site a request for credentials 21 in the form of a logical expression. If the local site finds in step 32 that it does not possess credentials that satisfy the request (and if some kind of response is required, as when the Security Agent belongs to a server), a refusal can be sent in step 33. Otherwise, the Security Agent must determine in step 34 whether sufficient trust has already been established in the opposing site to justify providing a combination of credentials that satisfies the request. Specifically, opposing-site credentials 23 that accompany the request 21 or that are already cached locally 104 might satisfy the access policies 102 that govern local credentials 103 that, in turn, would satisfy the incoming request 21. In that case, the combination of local credentials, unlocked in this way and satisfying the incoming request 21, can immediately be sent 26 to the opposing site 11, as shown in step 35. When the current incoming request was received as the response to a previous request by the local site, that previous request can be repeated in step 35 in conjunction with the credentials being sent, under the presumption that those credentials will now engender trust to unlock fulfilment of the earlier request.

On the other hand, step 34 may determine that the locally-available, opposing-site credentials (23 and/or 104) are not sufficient to unlock a combination of locally-owned credentials 103 that satisfies the incoming request 21. In that case, in step 36 the Security Agent 101 derives an outgoing request 22 for further credentials from the opposing site 11 by logically combining the incoming request for credentials 21 with the local-site credential access policy 102. These opposing-site credentials are requested for the purpose of unlocking local-site credentials that have been requested by the opposing site. Thus, to avoid requesting credentials unnecessarily, the derivation process simplifies the request by taking into account which of the requested credentials the local-site actually possesses 103 and, moreover, by not requesting additional opposing-site credentials to unlock local-site credentials that are already unlocked by the accumulated 104 and/or incoming 23 opposing-site credentials.

In step 37, when the Security Agent 101 sends the request for further opposing-site credentials to unlock local-site credentials, it can choose at the same time to provide some local-site credentials that are already unlocked. For instance, it may provide some local-site credentials mentioned in the incoming request for credentials 21. While risking unnecessary credential disclosure, this negotiation-strategy decision can increase the likelihood and the speed with which the negotiation succeeds. It does so by increasing the chance that the opposing site will immediately provide the credentials being requested of it and by decreasing the chance that the opposing site will conclude that there is a cyclic interdependence within the two sites' combined credential-access policies and therefore abort the negotiation.

As shown in FIG. 1, when a local site is a server and the opposing site is a client, the content of the message incoming to the server from the client can include a service request 24. Such a service request is a typical initial message in a negotiation of credential disclosure between a client and a server. Upon receiving a request for service 24, the server's Security Agent 101 applies a service-governing policy (not shown in FIG. 1) to determine whether the opposing-site credentials 23 that accompany the request are sufficient to satisfy the service-governing policy (this is also true of the second prior art approach discussed above). Although some servers are stateless and therefore do not retain client credentials after each client request, others may, like clients, cache opposing-site credentials 104. Such servers make use of cached opposing-site credentials 104, as well as those 23 that accompany the request to attempt to satisfy their service-governing policies. Whether or not cached-opposing-site credentials 104 are used, when the service-governing policy is satisfied, the service is authorized 25. Otherwise, the Security Agent 101 returns the service-governing policy, in the form of an outgoing request for credentials 22. Credential disclosure is then negotiated between the client and server and, if successful, the client can repeat the service request with sufficient credentials attached to authorize service. An example of such an exchange is shown in FIG. 3.

Figure 2:
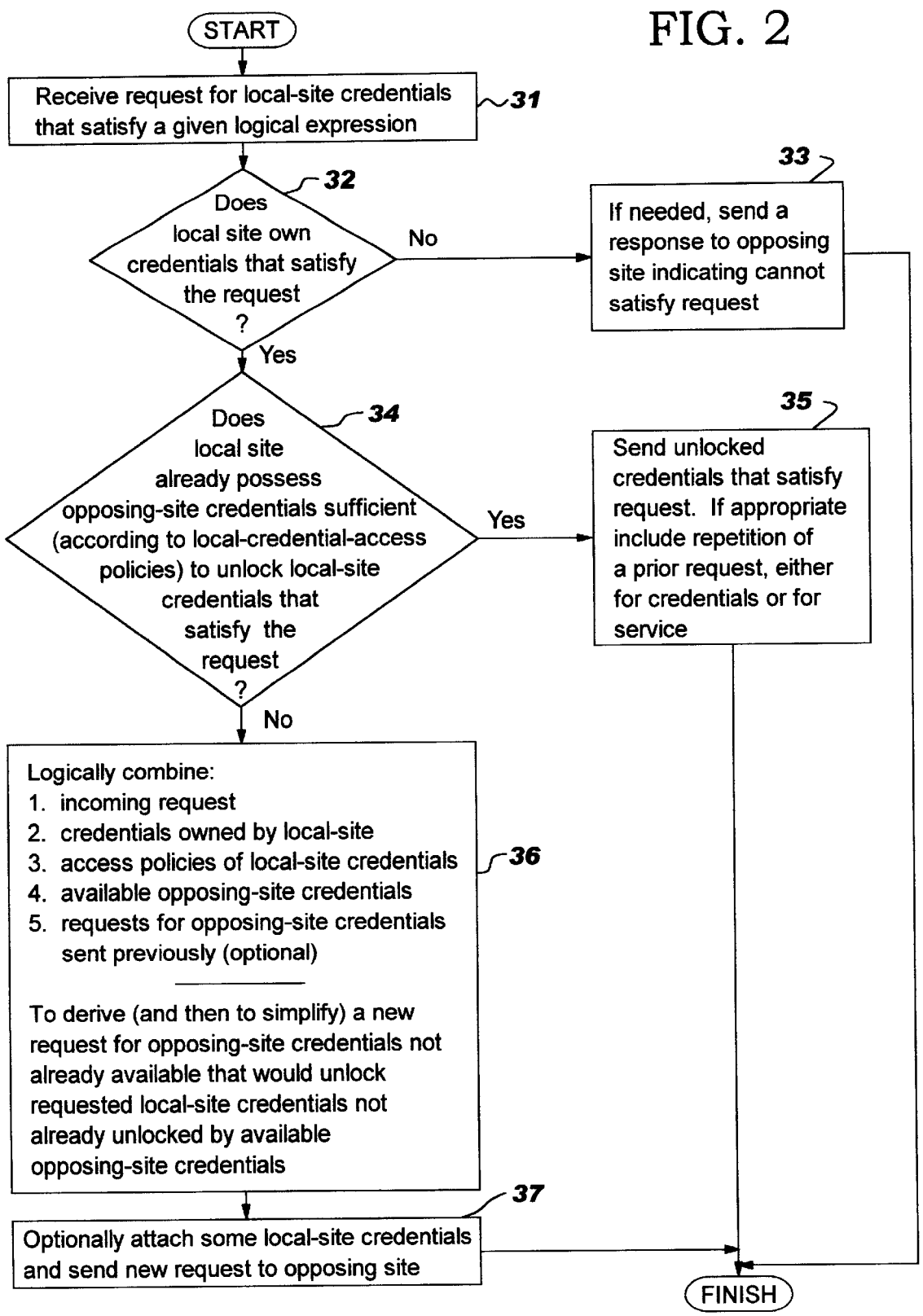
FIG. 2 is a flowchart showing the processing steps carried out by a local site, according to a preferred embodiment of the present invention.
Figure 3:
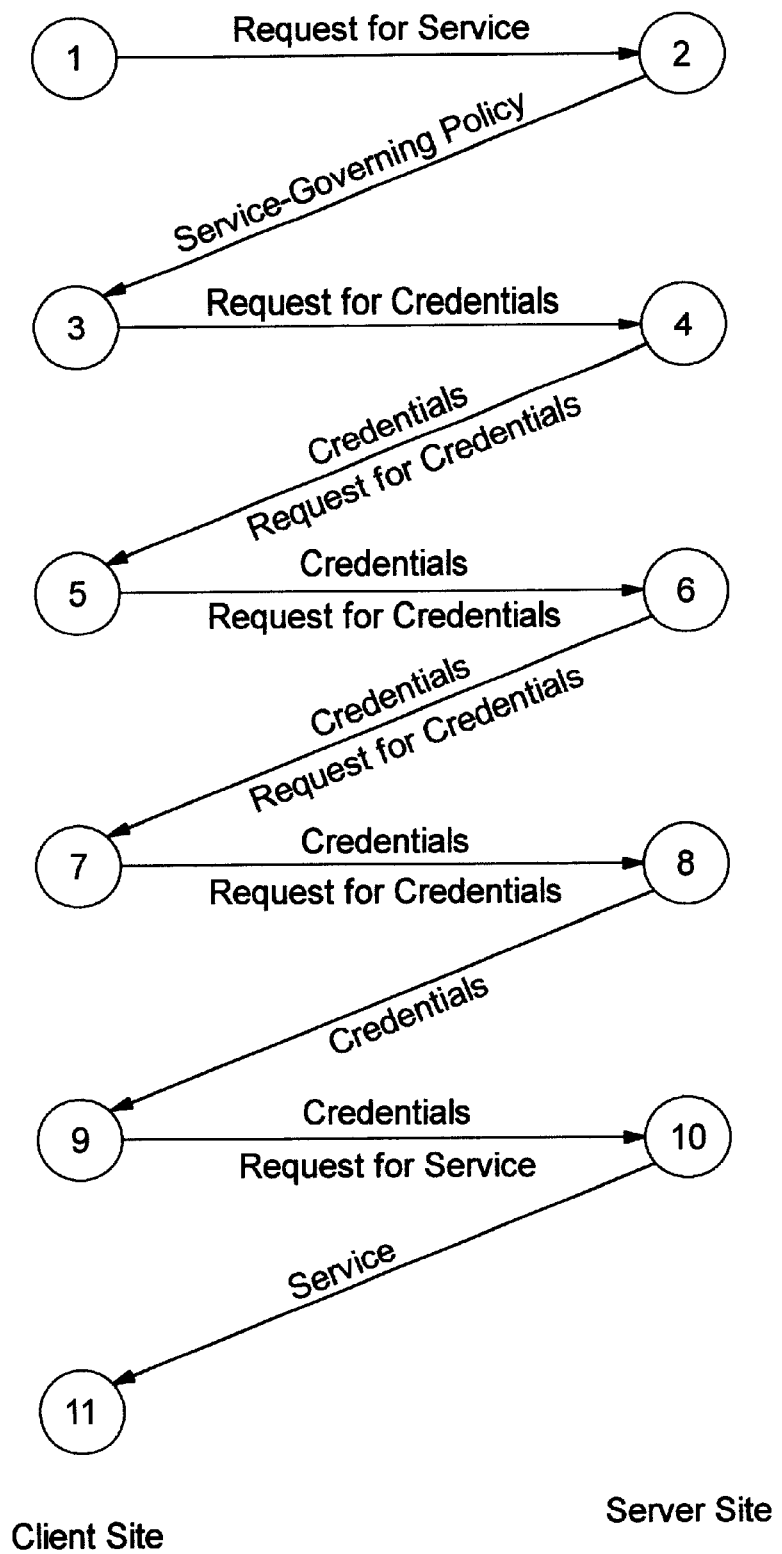
FIG. 3 is an exemplary timing diagram showing a sequence of requests and replies, according to a preferred embodiment of the present invention.

In FIG. 3, at stage 1, the client sends a request for a particular service to the server site, requesting that the server carry out a particular processing task (e.g., read access to a database) on behalf of the client. No credentials are attached to the request, presumably because the client does not know the credential policy governing that service. At stage 2, the server Security Agent sends the client Security Agent the service-governing policy, which informs the client Security Agent of its options regarding credentials to submit to engender sufficient trust on the server Security Agent's part to have the requested service carried out. This policy constitutes a request for credentials, and is treated as such when it is received by the client Security Agent in stage 3. The client Security Agent responds according to the steps discussed above in conjunction with the flowchart of FIG. 2.

That is, the client Security Agent receives the request for credentials (step 31) (to authorize the service requested in stage 1). It determines that the client possesses at least one combination of credentials that satisfies the request (step 32). It determines that there are not sufficient server credentials available locally to satisfy the access-control policies of the constituent credentials of any of those satisfactory combinations (step 34). It therefore derives a new request (step 36), designed to unlock such a satisfactory combination of its own credentials, which would in turn unlock the desired service. Finally,. it sends that request to the server without any credentials attached. (In a variant of the example, the client might at this point attach to the outgoing request some credentials requested by the server in stage 2, for instance, if their access-control policies permitted them to be disclosed without prior knowledge of the server.)

Stage 4 begins when the server's Security Agent receives the request for credentials sent by the client at the end of stage 3. This request is again processed as discussed above in conjunction with the flowchart of FIG. 2. The server's Security Agent determines that it has credentials that will satisfy the client Security Agent's request (step 32) and that they are not all unlocked for disclosure to the client Security Agent (step 34) (the server Security Agent has not yet received any credentials from the client Security Agent). It derives a request (step 36) for client credentials intended to unlock the credentials requested of it by the client Security Agent, and sends it (step 37) to the client Security Agent, along with some credentials the client Security Agent requested and whose access-control policies permit them to be disclosed without seeing any client credentials first.

Stage 5 begins when the client's Security Agent receives the request and the credentials sent by the server Security Agent at the end of stage 4. The client Security Agent determines that it has credentials that satisfy the request (step 32), but that no satisfactory combination is composed of credentials whose access-control policies are unlocked by the server credentials received so far (step 34). In an effort to unlock more of its own credentials, the client Security Agent then derives a new request for server credentials as follows (step 36). It modifies the incoming request for credentials by replacing references to credentials it does not possess with the constant false. Then it replaces each remaining occurrence of a credential, which is does possess, by the access policy for that credential. The resulting formula, like those access policies, is expressed in terms of opposing-site credentials. It is next conjoined with the request for credentials previously sent by the client to the server at the end of stage 3, which may not yet be fully satisfied by the credentials received from the server. The Security Agent simplifies the resulting conjunction, to avoid requesting credentials unnecessarily. Simplification is done by eliminating from the formula each occurrence of a credential that the client Security Agent has already received and that satisfies the attribute constraints expressed in the formula. The resulting formula is simplified, treating eliminated credentials as the constant true and simplifying logical connectives accordingly. (An occurrence of true in a conjunction is simply eliminated; an empty conjunction is replaced by true; a disjunction containing true is replaced by true.) Finally, the client Security Agent sends the formula it has derived and simplified in this way, sending as well any credentials requested in the incoming request whose access-control policies are unlocked by server credentials received at the start of this stage.

Stage 6 begins when the server's Security Agent receives the request and the credentials sent to it by the client Security Agent at the end of stage 5. The server Security Agent determines that it has credentials that satisfy the request (step 32), but that they are not all unlocked (step 34). It then derives a a new request for client credentials (step 36) by much the same procedure illustrated on the client side in Stage 5. The principal difference in the derivation on the server side from that on the client side is that, in the negotiation strategy illustrated in this example, the server does not reuse its prior requests for client credentials.

Stage 7 begins when the client's Security Agent receives the request and the credentials sent by the server Security Agent at the end of stage 6. The client Security Agent determines that it has at least one combination of credentials that satisfies the request (step 32). The client now has received sufficient server credentials to unlock such a combination of credentials (step 34). So it sends one such combination to the server at the end of stage 7, along with the same request for credentials that it sent to the server at the end of stage 5.

Stage 8 begins when the server's Security Agent receives the repeated request and the credentials sent to it by the client at the end of stage 7. The server Security Agent determines that it has credentials that satisfy the request (step 32) and that they are unlocked (step 34) because their access-control policies are satisfied by client credentials sent by the client at the end of stage 7. It then sends those credentials to the client.

Stage 9 begins when the client's Security Agent receives the credentials sent by the server at the end of stage 8. Those credentials, together with credentials received by the client Security Agent at the start of stages 5 and 7, and cached by the client Security Agent since that time, satisfy the access-control policies of client credentials that satisfy the service-governing policy received by the client Security Agent in stage 3. The client Security Agent then sends a combination of unlocked credentials that together satisfy the service-governing policy. It also repeats the original service request.

Stage 10 begins when the server's Security Agent receives the service request and the credentials sent by the client at the end of stage 9. Those credentials satisfy the service-governing policy, so the service is authorized, performed, and its result, returned. It is received by the client in stage 11, which concludes the example.

EXAMPLE NEGOTIATION

The example presented here illustrates the eleven steps of the hypothetical negotiation pictured schematically in FIG. 3. It is intended to illustrate the manipulation of formulas, as prescribed by the preferred embodiment of the present invention. The formulas are expressed informally. The example is for illustration only and is not intended to accurately characterize any real negotiation, credentials, or policies.

Hypothetical Credentials

Each credential's entry begins with the abbreviation used for that credential in the rest of the example.

Security-Practices Credentials—Held by Both Client and Server

We suppose that Security-Practices-Standards consultants issue Security-Practices credentials to entities whose security infrastructure they rate. The rating can be used by third parties to estimate the likelihood that information provided to the entity will inadvertently be disclosed by that entity. To enable a rated entity to demonstrate that they met the requirements of a certain grade while keeping private the grades they failed to meet, a separate credential is issued for each grade, with an attribute called "passed" that has the value true when the requirements for that grade were met, false otherwise.

In our example, there are four security-practices grades, low, medium, high, and very high. The maximum grade met by the server is "high" and the maximum grade met by the client is "medium". Each entity protects the credentials it has for grades that it failed. If the credentials for grades it passed were not also protected, the difference in protection would make it obvious which grades were failed. So credentials for all grades (except the lowest) are protected, whether the owner passed or failed.

Very High Security-Practices Grade. High sensitivity.
High Security-Practices Grade. Medium sensitivity.
Med Security-Practices Grade. Low sensitivity.
Low Security-Practices Grade. Not sensitive.

Client Credentials

Contract Destination Contracts. Issued by party expecting delivery of goods. Extremely sensitive. Need to be sure that the information will not be leaked to a competitor.

Credit Letter of Credit. Issued by creditor to owner. Medium-high sensitivity.

Dock Warehouse Agreement at Originating Dock. Issued by dock management. Medium sensitivity. Need to avoid dissemination to competitors.

S-Receipt Prior Shipping Receipt. Issued by shipper carrying goods in the past. The client in this example does not have any Prior Shipping Receipts.

Account Established account with the server/shipper. Issued by shipper. In this example the client does not have an established account with the server/shipper.

B-Org Business Organization Membership Credential. Issued by a business organization, such as the International Chamber of Commerce. Not sensitive.

Server Credentials

Receipt Prior Delivery Receipt. Issued by owner of goods carried in the past. Not Sensitive.

Bond Bonding Certification. Issued by bonding agency. Not sensitive.

Ref References from Manufacturers. Issued by manufacturers willing to recomend the shipper based on prior business experience. Low sensitivity. The server in the example has at least two of these from different manufacturers.

B-Org Business Organization Membership Credential. Issued by a business organization, such as the International Chamber of Commerce. Not sensitive.

Hypothetical Policies

The policy that governs a client or server credential X is designated by $X_{client}$ or $X_{server}$, respectively. The policies expressed here are not complete. In particular, they do not express requirements of supporting credentials, which are essential. Although not entirely complete or realistic, the clauses introduced by "where" illustrate the use of constraints on credential attributes. For instance, the client's access control policy for its Destination Contracts credential requires references from two different credential issuers.

Client's Credential-Governing Policies $Contract_{client}$=High AND $Ref_1$ AND $Ref_2$ AND (Bond OR ($Receipt_1$ AND $Receipt_2$)) where High.passed=true AND $Ref_1.issuer \approx Ref_2.issuer$ AND $Receipt_1.issuer \approx Receipt_2.issuer$ $Credit_{client}$=Med AND $Ref_1$ AND $Ref_2$ where Med.passed=true AND $Ref_1.issuer \approx Ref_2.issuer$ $Dock_{client}$=Med AND (Bond OR ($Receipt_1$ AND $Receipt_2$)) where Med.passed=true AND $Receipt_1.issuer \approx Receipt_2.issuer$ Very $High_{client}$=High AND B-Org where High.passed=true $High_{client}$=Med AND B-Org where Med.passed=true $Med_{client}$=Low AND B-Org where Low.passed=true $Low_{client}$=No Credentials Required Server's Credential-Governing Policies $Receipt_{server}$=No Credentials Required $Bond_{server}$=No Credentials Required $Ref_{server}$=Low where Low.passed=true Very $High_{server}$=High AND B-Org where High.passed=true $High_{server}$=Med AND B-Org where Med.passed=true $Med_{server}$=Low AND B-Org where Low.passed=true $LOW_{server}$=No Credentials Required Server's Service-Governing Policy for Scheduling a Shipment Account OR (Dock AND ((S-$Receipt_1$ AND S-$Receipt_2$) OR Contract) AND Credit) where S-$Receipt_1.issuer \approx$ S-$Receipt_2.issuer$ Negotiation Steps The example is a successful negotiation. Requests for credentials are sent at the end of stages 2 through 7. The client credentials requested by the server at the end of stage 2 are needed to authorize service. The remainder of the negotiation serves to establish sufficient trust for the client to disclose those credentials to the server. The credentials requested in stages 3 through 7 are needed to unlock access to credentials that in turn are needed for a successful negotiation.

In each stage in which a site receives a request for credentials, the site owns credentials that satisfy the request and step 32 of FIG. 2 is successful. At the end of each such stage, the operative Security Agent sends to the opposing site all credentials requested in the incoming request whose access policies are unlocked by opposing-site credentials that are available locally. These are labeled "unlocked, requested credentials" below. In the negotiation strategy illustrated by this example, the client's Security Agent caches and repeats previous requests, while the server's does not.

Stage 1—Client Sends Service Request: Schedule Shipping Dates

Stage 2—Server Receives Request, Returns the Service-Governing Policy

Server needs to establish trust that the client really is in the market for shipping services and can pay for them. Sends Service-Governing Policy for Scheduling a Shipment shown above.

Stage 3—Client Receives Request for Credentials to Authorize Service

Server credentials available locally: None Unlocked, requested credentials: None (step 34 fails) Incoming request, simplified by eliminating credentials the client does not possess:

Dock AND Contract AND Credit

This formula, with each credential substituted by its (bracketed) access policy:

[Med AND (Bond OR (Receipt$_1$ AND Receipt$_2$)) where Med.passed=true AND Receipt$_1$.issuer≈Receipt$_2$.issuer] AND

[High AND Ref$_1$ AND Ref$_2$ AND (Bond OR (Receipt$_1$ AND Receipt$_2$)) where High.passed=true AND Ref$_1$.issuer≈Ref$_2$.issuer AND Receipt$_1$.issuer≈Receipt$_2$.issuer] AND

[Med AND Ref$_1$ AND Ref$_2$ where Med.passed=true AND Ref$_1$.issuer≈Ref$_2$.issuer]

The formula, simplified, as sent to the server as a credential request at the end of stage 3:

High AND Ref$_1$ AND Ref$_2$ AND (Bond OR (Receipt$_1$ AND Receipt$_2$)) AND Med where High.passed=true AND Ref$_1$.issuer≈Ref$_2$.issuer AND Receiptl.issuer≈Receipt$_2$.issuer AND Med.passed=true Stage 4—Service Receives Request for Credentials Client credentials available locally: None Unlocked, requested credentials: Bond (step 34 fails) The incoming request, with each credential substituted by its (bracketed) access policy:

[Med AND B-Org where Med.passed=true] AND
[Low where Low.passed=true] AND
[Low where Low.passed=true] AND
([No Credentials Required] OR ([No Credentials Required] AND [No Credentials Required])) AND
[Low AND B-Org where Low.passed=true]

This formula, simplified, as sent to client at the end of stage 4:

Med AND Low AND B-Org where Med.passed=true AND Low.passed=true

Stage 5—Client Receives Request for Credentials and One Server Credential

Server credentials available locally: Bond Unlocked, requested credentials: Low, B-Org (step 34 fails) The incoming request, with each credential substituted by its (bracketed) access policy:

[Low AND B-Org where Low.passed=true] AND
[No Credentials Required] AND [No Credentials Required]

This formula, conjoined with the request sent to the server at end of stage 3:

[[Low AND B-Org where Low.passed =true] AND [No Credentials Required] AND [No Credentials Required]] AND

[High AND Ref$_1$ AND Ref$_2$ AND (Bond OR (Receipt$_1$ AND Receipt$_2$)) AND Med where High.passed=true AND Ref.issuer≈Ref$_2$.issuer AND Receipt$_1$.issuer≈Receipt$_2$.issuer AND Med.passed= true]

The request, simplified by eliminating server credentials available locally, as sent to server at the end of stage 5:

Low AND B-Org AND High AND Ref$_1$ AND Ref$_2$ AND Med where Low.passed=true AND High.passed=true AND Ref$_1$.issuer≈Ref$_2$.issuer AND Med.passed=true Stage 6—Server Receives Request for Credentials and Two Client Credential Client credentials available locally: Low, B-Org Unlocked, requested credentials: Low, B-Org, Med (Step 34 fails) The incoming request, with each credential substituted by its (bracketed) access policy:

[No Credentials Required] AND
[No Credentials Required] AND
[Med AND B-Org where Med.passed =true] AND
[Low where Low.passed=true] AND
[Low where Low.passed=true] AND
[Low AND B-Org where Low.passed=true]

The request, simplified by eliminating client credentials available locally, as sent to the client at the end of stage 6: Med where Med.passed=true Stage 7—Client Receives Request for Credentials and Three Server Credentials Server credentials available locally: Bond (cached since stage 5), Low, B-Org, Med Unlocked, requested credentials: Med (Step 34 succeeds) Request sent to server at the end of stage 5 (see step 35):

Low AND B-Org AND High AND Ref$_1$ AND Ref$_2$ AND Med where Low.passed=true AND High.passed=true AND Ref$_1$.issuer≈Ref$_2$.issuer AND Med.passed=true The request, simplified by eliminating server credentials available locally, as sent to server at the end of stage 7:

High AND Ref$_1$ AND Ref$_2$ where High.passed=true AND Ref$_1$.issuer≈Ref$_2$.issuer Stage 8—Server Receives Request for Credentials and One Client Credential Client credentials available locally: Low, B-Org (both cached since stage 6), Med Unlocked, requested credentials: High, Ref$_1$, Ref$_2$ (Step 34 succeeds, credentials sent in step 35)

Stage 9—Client Receives Three Server Credentials that Finish Unlocking the Client Credentials that will Authorize Service Since no further request for credentials is received, the relevant request (step 31) becomes once more the service-governing policy received at the start of stage 3.

Server credentials available locally: Bond (Received in stage 5) Low, B-Org, Med (Received in stage 7) High, Ref$_1$, Ref$_2$ (Received in stage 9) Unlocked, requested credentials: Dock, Contract, Credit (Step 34 succeeds) Request for service, Schedule Shipping Dates, first sent in stage 1, is now repeated with requested credentials attached.

Stage 10—Server Receives Service Request and Three Attached Credentials, Authorizes Service The server confirms that the attached credentials satisfy the service governing policy and authorizes the requested service. The result of that service is returned at the end of Stage 10.

Stage 11—Client Receives the Service it Requested

We claim:

1. A data processing system for use in a client/server network where a client data processing apparatus sends a data processing request to the server data processing apparatus and the server data processing apparatus performs data processing based on the request and returns a reply to the client data processing apparatus, the data processing system comprising:

storage means for storing a plurality of local site credentials;

means for receiving a first credentials request from an opposing site data processing apparatus, the credentials requested by the first credentials request being local site credentials stored in the storage means that satisfy a first logical expression provided with the first credentials request; and means for sending to the opposing site data processing apparatus a second credentials request which is dependent upon the contents of the first credentials request, the credentials requested by the second credentials request being opposing site credentials that satisfy a second logical expression provided with the second credentials request.

2. The system of claim 1 wherein the storage means also stores a plurality of credential access policies, each policy governing access to a corresponding local site credential based on opposing site credentials.

3. The system of claim 2 further comprising:

determining means for determining whether the first logical expression provided with the first credentials request is satisfied by a combination of local site credentials stored in the storage means, and when a determination is made that the first logical expression provided with the first credentials request is satisfied by a combination of local site credentials stored in the storage means, determining whether the credential access policies stored in the storage means and governing said combination of local site credentials that satisfy the first logical expression provided with the first credentials request are satisfied by opposing site credentials that are available locally;

sending means for sending the combination of local site credentials to the opposing site data processing apparatus when the determining means determines that the credential access policies are satisfied by opposing site credentials that are available locally; and logical combining means for, when the determining means determines that the credential access policies are not satisfied by opposing site credentials that are available locally, logically combining (a) the received first credentials request, (b) the stored local site credentials and (c) the stored credential access policies to derive the second logical expression in the second credentials request for opposing site credentials that, together with opposing site credentials available locally, satisfy the local credential access policies that govern the combination of local site credentials that satisfy the first logical expression provided with the first request for local site credentials.

4. The data processing system of claim 3 wherein the determining means, upon finding that such a combination does not exist, sends a message conveying that finding to the opposing site data processing apparatus.

5. The data processing system of claim 1 wherein the opposing site data processing apparatus is a client data processing apparatus.

6. The data processing system of claim 1 wherein the opposing site data processing apparatus is a server data processing apparatus.

7. The data processing system of claim 1 wherein opposing site credentials are cached into local storage.

8. The data processing system of claim 1 wherein the client/server network is the Internet. request.

9. A method of operating a data processing apparatus for use in a client/server network where a client data processing apparatus sends a data processing request to the server data processing apparatus and the server data processing apparatus performs data processing based on the request and returns a reply to the client data processing apparatus, the data processing apparatus comprising a storage means for storing a plurality of local site credentials; the method comprising steps of:

receiving a first credentials request from an opposing site data processing apparatus, the credentials requested by the first credentials request being local site credentials stored in the storage means that satisfy a first logical expression provided with the first credentials request; and sending to the opposing site data processing apparatus a second credentials request which is dependent upon the contents of the first credentials request, the credentials requested by the second credentials request being opposing site credentials that satisfy a second logical expression provided with the second credentials request.

10. The method of claim 9 wherein the storage means also stores a plurality of credential access policies, each policy governing access to a corresponding local site credential based on opposing site credentials.

11. The method of claim 10 further comprising the steps of:

determining whether the first logical expression provided with the first credentials request is satisfied by a combination of local site credentials stored in the storage means, and when a determination is made that the first logical expression provided with the first credentials request is satisfied by a combination of local site credentials stored in the storage means, determining whether the credential access policies stored in the storage means and governing said combination of local site credentials that satisfy the first logical expression provided with the first credentials request are satisfied by opposing site credentials that are available locally;

sending the combination of local site credentials to the opposing site data processing apparatus when the determining step determines that the credential access policies are satisfied by opposing site credentials that are available locally; and when the determining step determines that the credential access policies are not satisfied by opposing site credentials that are available locally, logically combining (a) the received first credentials request, (b) the stored local site credentials and (c) the stored credential access policies to derive the second logical expression in the second credentials request for opposing site credentials that, together with opposing site credentials available locally, satisfy the local credential access policies that govern the combination of local site credentials that satisfy the first logical expression provided with the first request for local site credentials.

12. The method of claim 9 wherein the opposing site data processing apparatus is a client data processing apparatus.

13. The method of claim 9 wherein the opposing site data processing apparatus is a server data processing apparatus.

14. The method of claim 9 wherein opposing site credentials are cached into local storage.

15. The method of claim 9 wherein the client/server network is the Internet.

16. A computer program product stored on a computer readable storage medium for, when run on a data processing apparatus, instructing the data processing apparatus to perform the method steps of claim 9.

17. A computer program product data signal embodied in a carrier wave, for, when run on a data processing apparatus, instructing the data processing apparatus to perform the method steps of claim 9.

* * * * *

UNITED STATES PATENT AND TRADEMARK OFFICE
CERTIFICATE OF CORRECTION

PATENT NO.    : 6,349,338 B1                                               Page 1 of 1
DATED         : February 19, 2002
INVENTOR(S)   : K.E. Seamons et al.

It is certified that error appears in the above-identified patent and that said Letters Patent is hereby corrected as shown below:

Column 1,
Please insert the following paragraph before line 6,

-- This invention was made with Government support under Contract F30602-98-C-0222 awarded by the Air Force. The Government has certain rights in this invention. --

Signed and Sealed this

Eighteenth Day of February, 2003

JAMES E. ROGAN
*Director of the United States Patent and Trademark Office*